United States Patent Office 3,273,396
Patented Sept. 20, 1966

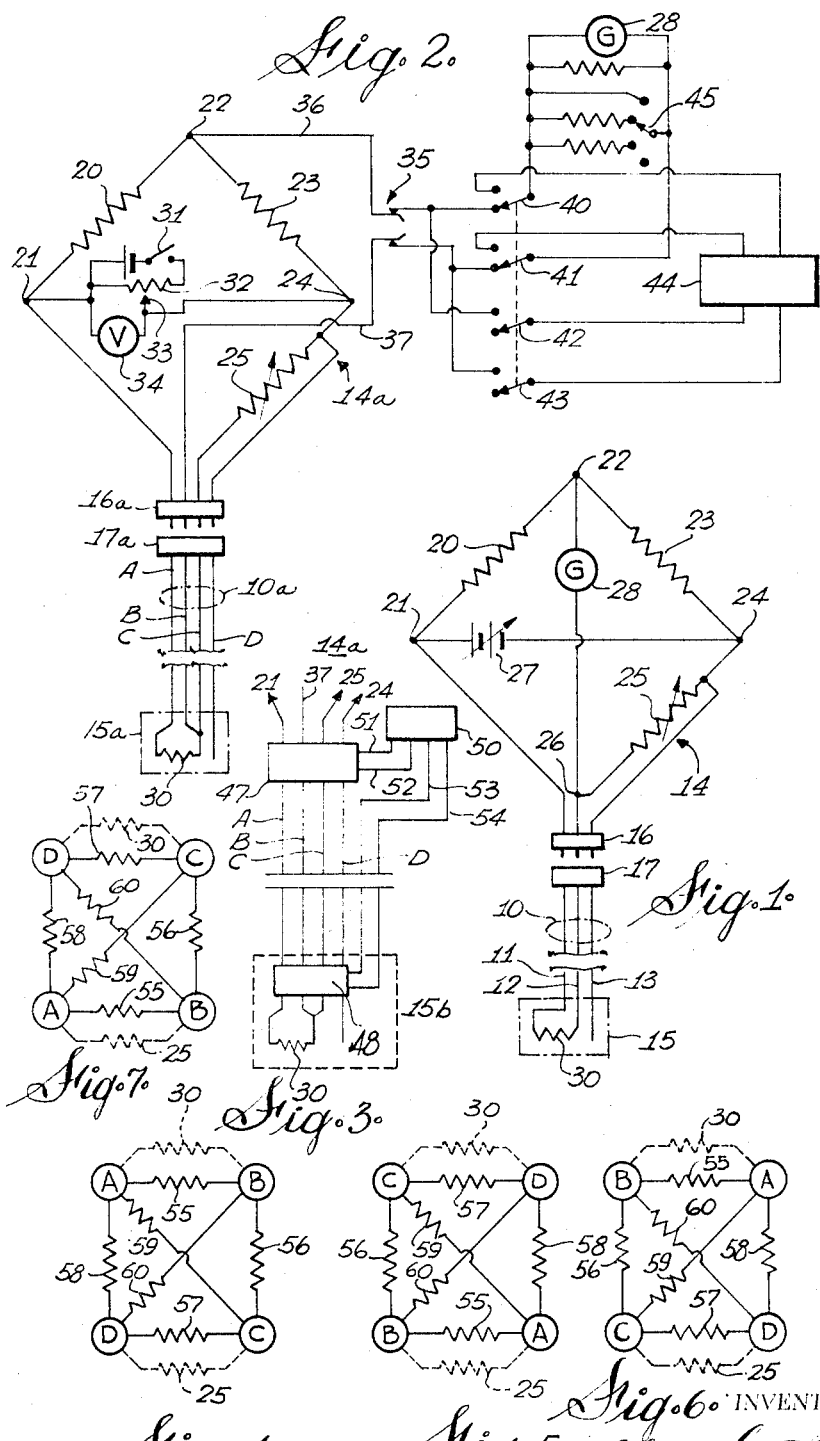

3,273,396
APPARATUS FOR MEASURING RESISTANCE AT
THE END OF A LONG CABLE
Alan E. Beck, London, Ontario, Canada, assignor to
Canadian Patents and Development Limited, Ontario, Canada, a corporation of Canada
Filed Sept. 3, 1963, Ser. No. 306,063
6 Claims. (Cl. 73—362)

This invention relates to apparatus for measuring resistance at the end of a long cable, and in particular it relates to apparatus for measuring the resistance of a temperature variable resistance at the end of a long cable to determine temperature.

It is often desirable in certain applications to be able to determine accurately the value of a resistance at a remote point. It may, for example, be useful in a remote control or a remote measuring application. A specific requirement for resistance measuring apparatus is the remote measurement of temperature at various water depths or at various depths in a borehole. The apparatus of the invention is particularly suited to the measurement of temperature in a borehole and will be described in that regard. The apparatus is, however, quite suitable for other remote resistance measurements.

Accurately measured temperatures in a borehole are useful, for example, in the determination of terrestrial heat flow across the crust of the earth. The accuracy required in such a temperature measurement may, for example, be of the order of 0.01° C. Apparatus used for these measurements should therefore be capable of this order of accuracy.

Many of the boreholes of interest are in relatively inaccessible or remote areas, and consequently the apparatus used for temperature measurement should be light and compact. In addition, because the measuring will frequently be done by non-technical people, the apparatus should be simple to operate and rugged.

Prior apparatus for measuring temperature in boreholes and the like has not been able to meet satisfactorily the requirements for accuracy, lightness, compactness, simplicity of operation and ruggedness.

The prior apparatus used has been of different types. For example, apparatus using maximum thermometers, platinum resistance thermometers, temperature variable resistances such as thermistors, and other types are known. Maximum thermometers provide accurate readings and are simple to use, however it is very time consuming to obtain a series of readings at various depths with a maximum thermometer, particularly when the depths are relatively large. Platinum resistance thermometers require bulky associated equipment including a cable for connecting the thermometer to the apparatus which must have very low resistance conductors. Apparatus using thermistors offers several advantages over these other types. In the prior art apparatus using a thermistor, the thermistor is lowered in the borehole by a cable which connects the thermistor to a resistance measuring apparatus at the surface. The resistance of the thermistor as measured at the surface gives an indication of the temperature at the thermistor. Because a thermistor has a relatively high temperature coefficient of resistance, it lends itself to accurate measurement. In addition, if the thermistor has a high resistance, the series resistance of the connecting cable has a decreased affect on the accuracy of the measurement.

In this prior type of resistance apparatus, it will be seen that there are conflicting requirements in the selection of components such as the temperature variable resistance element and the cable. If a high element resistance is selected for the temperature variable resistance, then the series resistance of the connecting cable may be neglected in the measurement. However, if too high a resistance is chosen when a long length of cable is used, then the resistance of the cable insulation (i.e., the distributed shunt resistance in the cable) which is effectively in parallel with the temperature variable resistance, will affect the accuracy of the reading. It has been found in the past that the following formula should govern the selection of components if an accuracy of 0.01° C. is to be achieved:

$$\frac{\text{insulation shunt resistance}}{\text{resistance of temperature variable element}} > 2000$$

Thus, if a high resistance element is chosen to avoid having to allow for errors due to the series resistance of conductors in the cable, then a fairly heavy cable is required to provide a sufficiently high insulation resistance as required by the aforementioned relationship between shunt resistance and element resistance. On the other hand, if a lower resistance element is chosen to enable a lighter cable to be used, then heavier conductors (lower resistance conductors) are required in the cable or compensation must be made for series conductor resistance. In addition, it will be apparent that the variation in the series and shunt resistance with temperature must be known if corrections are to be applied.

The present invention is for an improvement to apparatus of the type using a temperature variable resistance, and it seeks to overcome the difficulties inherent in prior apparatus.

It is therefore an object of the invention to provide an apparatus of novel design for remotely and accurately measuring resistance.

It is another object of the invention to provide apparatus for measuring resistance at the end of a long cable which apparatus compensates for errors due to cable shunt resistance.

It is yet another object of the invention to provide apparatus for measuring resistance at the end of a long cable which apparatus compensates for errors due to the series resistance of conductors in the cable.

It is another object of the invention to provide a light, compact, rugged apparatus for accurately measuring the temperature at a remote point.

These and other objects and advantages of the invention will appear from the following description taken in conjunction with the accompanying drawings in which FIGURE 1 is a simplified schematic drawing of apparatus for remotely measuring temperature according to one embodiment of the invention, FIGURE 2 is a simplified schematic drawing of apparatus for remotely measuring temperature according to another embodiment of the invention, FIGURE 3 is a partial schematic drawing showing a variation of the FIGURE 2 embodiment, and FIGURES 4, 5, 6 and 7 are schematic drawings useful in explaining the invention.

Briefly, the invention in one form is for apparatus for remotely measuring resistance comprising a cable having at least three conductors with distributed shunt resistance therebetween interconnecting the indicating and remote or sensing portions of the apparatus. A resistance having an unknown value is connected at one end of the cable. This is the resistance whose value is to be measured and constitutes the remote or sensing portion. One of the conductors in the cable has an open circuit termination adjacent the resistance. An electric circuit is connected to the other end of the cable forming therewith a Wheatstone bridge having four arms, the resistance comprising one of the arms. The cable introduces an undesired cable shunt resistance into said one of said arms of the bridge, and connecting means connects the one conductor with the open circuit termination to an arm of the bridge adjacent said one of said arms to introduce therein a compensating shunt resistance.

Referring now to FIGURE 1, there is shown a cable 10 having conductors 11, 12 and 13 interconnecting an electric circuit 14 and a sensing unit 15. The length of cable 10 will, of course, depend on the depth to which measurements are required. Normally, this will be less than 6000 ft. and frequently cables of about 3000 ft. in length will suffice. It will be understood, however, that no difficulty is encountered in obtaining accurate readings using apparatus according to the invention with cable lengths up to about 10,000 ft. in length. When used with cables of a length greater than 10,000 ft., serious asymmetry of insulation resistance or cable shunt resistance may be encountered and it may be desirable to use a more precise manner of obtaining the readings as will subsequently be described in connection with FIGURE 3.

The cable 10 may be wound on a drum (not shown) driven by a winch (not shown) for ease of lowering and raising the sensing unit 15. A plug 16 and socket 17 may be used to interconnect the cable 10 with the electric circuit 14. Thus, the cable may be disconnected during lowering and raising of the sensing unit and connected to the circuit 14 when a reading is required. Alternatively, a system of brushes may be used to engage commutator rings on the drum axle, and the cable would then permanently connect the sensing element and the bridge network.

The electric circuit 14 comprises a resistance 20 connected between a junction point 21 and a junction point 22, a resistance 23 connected between junction point 22 and a junction point 24, and a variable resistance 25 connected between junction point 24 and a junction point 26. A source of direct current, shown as battery 27, is connected between junction points 21 and 24, and a galvanometer 28 or other current indicating device is connected between junction points 22 and 26.

The junction point 21 is connected by means of plug 16, socket 17, and conductor 11 to one side of a temperature variable resistance element 30, which is conveniently a thermistor and may be in a pressure proof container comprising sensing unit 15. Junction point 26 is connected by plug 16, socket 17 and conductor 12 to the other side of resistance element 30. It will be seen that the circuit 14 with cable conductors 11 and 12 and resistance 30 form a Wheatstone bridge. The resistances 20 and 23 comprise the ratio arms, while temperature variable resistance 30 is the unknown resistance and resistance 25 is the calibrated measuring resistance.

The function of the FIGURE 1 embodiment as described thus far will be apparent. The sensing unit 15 is lowered to a point where a reading is required, and the circuit is connected. The temperature variable resistance element 30 assumes a resistance depending on the surrounding temperature. The bridge is balanced and a reading of the resistance is obtained.

As has already been described, there is a distributed shunt resistance between the conductors in the cable and this will affect the measurement, particularly when resistance element 30 has a high value, because the cable shunt resistance between conductors 11 and 12 is effectively in parallel with resistance element 30. In the embodiment of the present invention as shown in FIGURE 1, the conductor 13, which has an open circuit termination in sensing unit 15, is connected by plug 16 and socket 17 to junction point 24. Thus the distributed shunt resistance between conductors 12 and 13 is introduced into the arm of the bridge adjacent the unknown resistance arm, effectively in parallel with resistance 25. If the shunt resistance between conductors 11 and 12 is the same as that between conductors 12 and 13, there may be complete compensation for shunt resistance because the shunt resistances are introduced on opposite sides of the bridge. The shunt resistance between conductors 11 and 13 acts as a high impedance in parallel with power supply 27 and does not affect the measurement. It will be apparent that at balance the following equation will hold:

$$\frac{R_{20}}{R_{23}} = \frac{R_{30}(R_{25} + R_{shunt})}{R_{25}(R_{30} + R_{shunt})}$$

and that for complete compensation $R_{25}$ should equal $R_{30}$. This will, of course, occur when the bridge has 1:1 ratio arms, that is when $R_{20}$ (resistance 20) equals $R_{23}$ (resistance 23).

Thus, for cables with a symmetrically distributed shunt resistance, there is complete compensation and no decrease in accuracy due to shunt resistance provided that the bridge uses 1:1 ratio arms. For cables which have an asymmetry of 5%, and in practice this is a relatively large asymmetry, the following ratio may be used to govern the selection of components:

$$\frac{\text{insulation shunt resistance}}{\text{resistance of temperature variable element 30}} > \frac{100}{1}$$

to achieve an accuracy of 0.01° C. It will be seen that this is a considerable improvement over the expression previously mentioned as governing prior art apparatus where $$\frac{\text{cable insulation shunt resistance}}{\text{resistance of the temperature variable element}} > \frac{2000}{1}$$

for the same accuracy.

While the embodiment of FIGURE 1 compensates for cable shunt resistance, it may be desirable to compensate for the series resistance of the conductors also. It will be apparent that the bridge in FIGURE 1 measures the series resistance of conductors 11 and 12 with the resistance of element 30. FIGURE 2 shows an embodiment of the invention which compensates for the error introduced by series resistance in addition to that introduced by cable shunt resistance.

Referring now to FIGURE 2, the resistances 20, 23 and 25 are shown as before forming three arms of a Wheatstone bridge. Again, resistance 20 is preferably made equal to resistance 23. In this embodiment, a four conductor cable is used to interconnect the electric circuit 14a with the remote unit 15a. The four conductor cable is designated as 10a and the conductors in the cable are designated A, B, C and D. The cable 10a is connected to the electric circuit by plug 16a and socket 17a.

In the FIGURE 2 embodiment, the source of direct current is shown as comprising a battery cell 27a in series with an on-off switch 31, both connected in parallel with a resistance 32 having a variable tap 33. This provides a variable direct current source, whose voltage is indicated on voltmeter 34, as is well known in the art. The variable source enables a current level to be selected that will not noticeably heat any components in the circuit. It will be understood that this supply is considered to be the same as that represented by the variable battery supply 27 of FIGURE 1, and also that any other equivalent supply could be used.

Also, in the FIGURE 2 embodiment a plug in socket 35 is provided to connect a current indicating means. Two conductors lead to socket 35, conductor 36 from junction point 22 and conductor 37. A galvanometer may be plugged into socket 35 to indicate the balance point of the bridge as in FIGURE 1. However, if more sensitivity is required, an amplifier may be connected as shown in FIGURE 2. The two conductors 36 and 37 may be connected through the switching arrangement comprising four ganged switches 40, 41, 42 and 43 either directly to galvanometer 28 or to the input of a direct current amplifier 44. The amplifier 44 is preferably a direct coupled transistorized amplifier which can be compact and light in weight, and which is very suitable for use in a rugged, self-contained apparatus. When the conductors 36 and 37 are connected to the input of amplifier 44, the amplifier output is connected to the galvanometer 28. The sensitivity of the bridge may be adjusted by varying the amplification of amplifier 44, or by a switch 45 which connects different shunting resistances across the galvanometer.

The use of amplifiers to increase the sensitivity of a measuring device is well known and it is believed that no further description is necessary. It will be understood that such an amplifier arrangement could be used in the FIGURE 1 embodiment.

Plug 16a and socket 17a connect junction point 21, conductor 37 and the end of resistance 25 remote from point 24, respectively to conductors A, B, and C in cable 10a. At the other end of cable 10a in the remote unit 15a, cable A is connected to one side of the temperature variable element 30 and conductors B and C are connected together to the other side of element 30. As before, conductor D has an open circuit termination in the unit 15a and is connected at the other end to junction point 24.

As in the case of FIGURE 1, the shunt resistance between conductors A and B is effectively in parallel with element 30 in the unknown arm of the bridge, while the shunt resistance between conductors C and D is effectively in parallel with the resistance 30 in the adjacent arm of the bridge. Furthermore, the shunt resistance between conductors A and C is effectively in parallel with resistance 30 while the shunt resistance between conductors B and D is effectively in parallel with resistance 25. The shunt resistance between A and D acts as a high impedance between junction points 21 and 24 (i.e., across the power supply); and the shunt resistance between B and C is effectively shorted because these conductors join in the remote unit 15a. As before, with equal ratio arms in the bridge, there will be a compensating or balancing out of the shunt resistance.

In addition, the series resistance of conductor A is in the unknown arm of the bridge in series with element 30, while the series resistance of conductor C is in the adjacent arm of the bridge in series with resistance 25. It will be apparent that the following balance condition will exist (ignoring shunt resistance):

$$\frac{R_{20}}{R_{23}} = \frac{R_{30} + R_{\text{series A}}}{R_{25} + R_{\text{series C}}}$$

From this it will be seen that if the ratio arms are 1:1 and if the series resistances of conductors A and C are the same, there will be a balancing out or compensation for the series resistance when the measurement is made. The series resistance of conductor B does not affect the measurement as this conductor carries no current when the bridge is balanced, and of course the series resistance of conductor D is normally several orders of magnitude less than the shunt resistance and conductor D carries only leakage current.

Thus, for a symmetrical cable, there may be theoretically perfect compensation for both cable shunt resistance and series resistance. The accuracy is therefore not dependent on temperature.

In practice, the series resistance of a pair of conductors may be different. If the normal practice is followed of calibrating the temperature variable resistance element on the cable there will be no significant error resulting from the difference in series resistance of the two conductors. Even when the temperature variable resistance element is calibrated independently of the cable, it is possible to maintain an accuracy of 0.01° C. with a cable where the difference in series resistance of a pair of conductors is as high as 1 part in 2000. Because of the balancing of the values, the accuracy of the measurement is still largely independent of temperature.

It will be recalled that when very long cables are used, serious asymmetry of cable shunt resistance may be encountered. If such asymmetry is encountered, it may be desirable to use the FIGURE 3 embodiment which is a variation of FIGURE 2.

Referring to FIGURE 3, there is shown a measuring apparatus using a six conductor cable. This embodiment has a measuring portion the same as FIGURE 2 and the electric circuit of FIGURE 2 would connect to the four conductors at the top of FIGURE 3 as indicated. In FIGURE 3 a stepping relay or stepping switch 47 is placed at the end of the cable adjacent the electric circuit 14a, and a similar stepping switch 48 is placed in the remote unit 15b. A control 50 is connected to switch 47 by conductors 51 and 52, and is connected to switch 48 by conductors 53 and 54 in the six conductor cable.

The switches 47 and 48 have four similar positions each, and they are advanced simultaneously to their respective positions by the control 50. This enables the conductors A, B, C and D in the cable to be interchanged with one another with regard to their position in the bridge.

Referring now to FIGURE 4, the four conductors A, B, C and D are shown, and the resistance element 30 and resistance 25 are indicated as they might be located in one position of switches 47 and 48. The cable shunt resistances are shown as resistances 55–60. Shunt resistance 55, effectively in parallel with resistance element 30 is balanced by shunt resistance 57, effectively in parallel with resistance 25. Similarly the shunt resistances 59 and 60 are balanced. Shunt resistance 56 is effectively shorted out by the series conductor resistance of conductors B and C, and shunt resistance 58 is effectively in parallel with power source. If the shunt resistances are seriously asymmetric, there will not be a complete balancing out when a single measurement is made. However, if the position of the conductors A, B, C and D were changed with respect to the electric circuit, then different shunt resistances would be introduced into the different arms of the bridge and a plurality of readings would cancel out the differences.

For example, a different arrangement of the conductors is shown in FIGURE 5. Shunt resistance 55 is now effectively in parallel with resistance 25, and shunt resistance 57 with resistance element 30. That is, the shunt resistances 55 and 57 have exchanged positions with respect to their FIGURE 4 positions. If a reading is taken in both the FIGURE 4 and 5 arrangement and an average of the two readings used, asymmetry with regard to shunt resistances 55 and 56 is nullified. However, the position of shunt resistances 59 and 60 have not changed from FIGURE 4 to FIGURE 5 and serious asymmetry here might have an affect on the accuracy. It will be apparent that two further different conductor arrangements as shown in FIGURES 6 and 7 would permit this asymmetry to be nullified. It will also be apparent that since each of the conductors A, B, C and D has been in a different position relative to the circuit when four readings are used, any serious asymmetry in the series resistance of the conductors will also be nullified. Thus, a series of four readings with the switches 47 and 48 in four different positions, would give an accurate reading in long cables even if considerable of shunt and series resistance asymmetry exists. For shorter or more symmetrical cables, a single reading will suffice.

It should be noted here that the addition of two conductors to the cable for control of the stepping switch to make a six conductor cable is useful for another reason and does not present as great a problem in weight increase as might appear at first sight. It is only with very long lightweight cables (i.e., greater than 10,000 ft. in length) that serious asymmetry of shunt resistance is likely to be encountered. As the length of self-supporting cable is increased, the strength must also be increased as there is greater weight to support. Thus, in very long lightweight cables, the use of a six conductor cable not only provides for control of the stepping switch but provides increased cable strength. If necessary, the conductor diameter may be increased for further increase in strength. The weight of the stepping switch is negligible compared to the weight of the cable to be supported.

It is believed that the apparatus according to the invention is simple, rugged and easy to use and provides an accurate measure of resistance at the end of a long cable. The apparatus is particularly suitable for measuring the resistance of a temperature variable resistance element suspended in a borehole at the end of a cable to determine the temperature in the region of the resistance element.

I claim:

1. Apparatus for remotely measuring resistance, comprising
   a cable having at least first, second and third conductors with distributed shunt resistance therebetween,
   a resistance having an unknown value electrically connected to said first and second conductors at one end of the cable,
       said third conductor in said cable having an open circuit termination at said one end of said cable,
   an electric circuit connected to the other end of said cable and forming therewith a Wheatstone bridge having four arms,
       said resistance comprising one of said arms,
       said cable introducing a cable shunt resistance into said one of said arms, and
   means connecting said third conductor at the other end of said cable to and in parallel with an arm of said bridge adjacent said one of said arms introducing therein a compensating shunt resistance.

2. Apparatus for remotely measuring temperature comprising
   a cable having at least first, second and third conductors with distributed cable shunt resistance therebetween,
   a temperature variable resistance electrically connected to said first and second conductors at one end of the cable,
       said third conductor in said cable having an open circuit termination at said one end of said cable,
   an electric circuit connected to the other end of said cable and forming therewith a Wheatstone bridge having four arms,
       said temperature variable resistance comprising one of said arms,
       at least the arm of said bridge adjacent said one of said arms having a variable resistance for balancing the bridge and obtaining an indication of the value of the temperature variable resistance in said one of said arms,
       said cable introducing an undesired cable shunt resistance into said one of said arms, and
   means connecting said third conductor at the other end of said cable to and in parallel with said arm adjacent said one of said arms for introducing therein a compensating shunt resistance.

3. Apparatus for remotely measuring resistance comprising,
   a cable having first, second and third conductors with distributed shunt resistance therebetween,
   a first resistance having an unknown value connected between said first and second conductors at one end of the cable,
       said third conductor having an open circuit termination at said one end of said cable,
   an electric circuit comprising a second resistance connected between a first and second junction point, a third resistance connected between said second and a third junction point, and a fourth resistance connected between said third and a fourth junction point,
   a current indicating means connected between said second and fourth junction points,
   a source of direct current connected between said first and third junction points, and
   connecting means on the other end of said cable connecting said first conductor to said first junction point and said second conductor to said fourth junction point forming with said electric circuit a Wheatstone bridge,
       said cable introducing an undesired cable shunt resistance in an arm of said bridge including said first and second conductors and said first resistance,
       said connecting means also connecting said third conductor to said third junction point introducing a compensating cable shunt resistance in an arm of said bridge including said fourth resistance.

4. Apparatus for remotely measuring resistance, comprising
   a cable having first, second, third and fourth conductors with distributed shunt resistance therebetween,
   a first resistance having an unknown value connected between said first and second conductors at one end of the cable,
       said third conductor being connected to said second conductor at said one end of said cable and said fourth conductor having an open circuit termination at said one end of said cable,
   an electric circuit comprising a second resistance connected between a first and a second junction point, a third resistance connected between said second and a third junction point, and a fourth resistance having one terminal connected to said third junction point,
   a current indicating means having two terminals, one of which is connected to said second junction point,
   a source of direct current connected between said first and third junction points, and
   connecting means on the other end of said cable connecting said first conductor to said first junction point, said second conductor to the other terminal of said current indicating means, and said third conductor to the other terminal of said fourth resistance,
   said first, second and third conductors forming with said electric circuit a Wheatstone bridge,
       said cable introducing an undesired cable shunt resistance and an undesired first conductor series resistance in an arm of said bridge including said first conductor and said first resistance,
   said third conductor introducing a compensating third conductor series resistance in an arm of said bridge including said third conductor and said fourth resistance,
       said connecting means also connecting said fourth conductor to said third junction point introducing a compensating cable shunt resistance in said arm of said bridge including said third conductor and said fourth resistance.

5. Apparatus for remotely measuring temperature, comprising
   a cable having six conductors with distributed shunt resistance therebetween,
   first switch means at one end of said cable operatively connected to the fifth and sixth conductors in the cable and having four positions interconnecting the first, second, third and fourth conductors in the cable to first, second, third and fourth terminals in a different arrangement for each switch position,
   a first resistance connected between said first and second terminals,
       said first resistance being temperature variable with a known relationship between temperature and resistance,
       said third terminal being conected to said second terminal, and said fourth terminal having an open circuit termination,
   second switch means at the other end of said cable having a pair of operative control connections and having four positions interconnecting the first, second, third and fourth conductors in the cable to fifth, sixth, seventh and eighth terminals in a different arrangement for each switch position, means at the said other end of the cable connected to said fifth and sixth conductors and to said pair of operative control connections for selectively operating said first and second switch means together to a respective one of said four positions,
    said first and second switch means being arranged and constructed to connect in turn in each of said four positions each of said first, second, third and fourth conductors between said first and fifth terminals, said second and sixth terminals, said third and seventh terminals, and said fourth and eighth terminals,
an electric circuit comprising a second resistance connected between a first and a second junction point, a third resistance connected between said second and third junction point, and a fourth resistance connected between said third junction point and said seventh terminal,
a current indicating means connected between said second junction point and said sixth terminal, and
a source of direct current connected between said first and third junction points,
    said first junction point being connected to said fifth terminal, and said third junction point to said eighth terminal,
    said cable, switch means and electric circuit forming a Wheatstone bridge,
said cable introducing an undesired cable shunt resistance in an arm of said bridge including said first resistance and effectively in parallel therewith, and introducing an undesired series cable resistance between said first and fifth terminals,
said third conductor introducing a compensating series cable resistance in an arm of said bridge including the cable conductor between said third and seventh terminals,
the conductor between said fourth and eighth terminals introducing a compensating cable shunt resistance in an arm of said bridge including said fourth resistance.

6. Apparatus as defined in claim 5, in which said current indicating means comprises a direct coupled transistorized amplifier and a galvanometer.

References Cited by the Examiner
UNITED STATES PATENTS

| | | | |
|---|---|---|---|
| 1,411,396 | 4/1922 | Wilson et al. | 73—362 X |
| 2,191,765 | 2/1940 | Lohman | 73—362 |

LOUIS R. PRINCE, *Primary Examiner.*

S. H. BAZERMAN, *Assistant Examiner.*